H. G. CARR.
MOTOR VEHICLE RUNNING GEAR.
APPLICATION FILED JULY 8, 1911.
1,061,981.
Patented May 20, 1913.
2 SHEETS—SHEET 1.
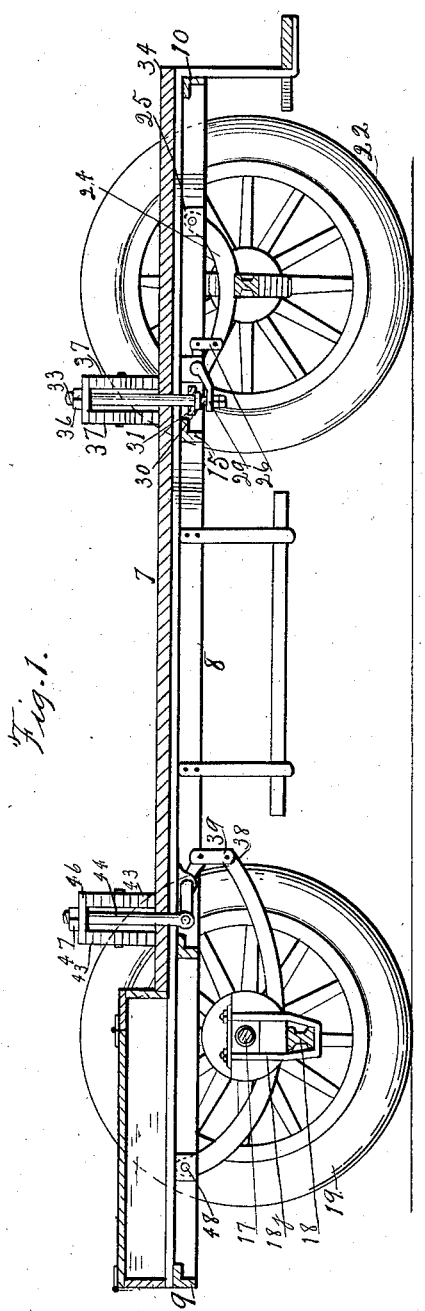
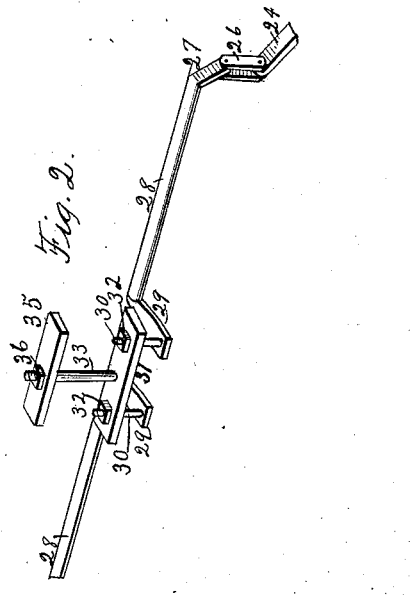
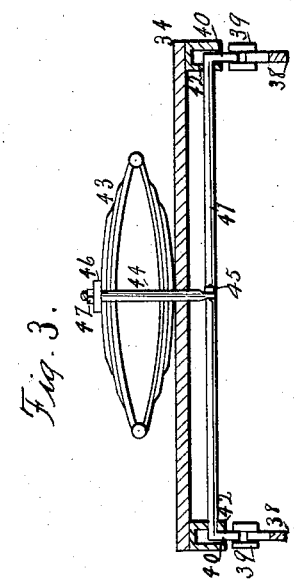
Witnesses
George A. Duley
John O. Klein
Inventor
Howard G. Carr

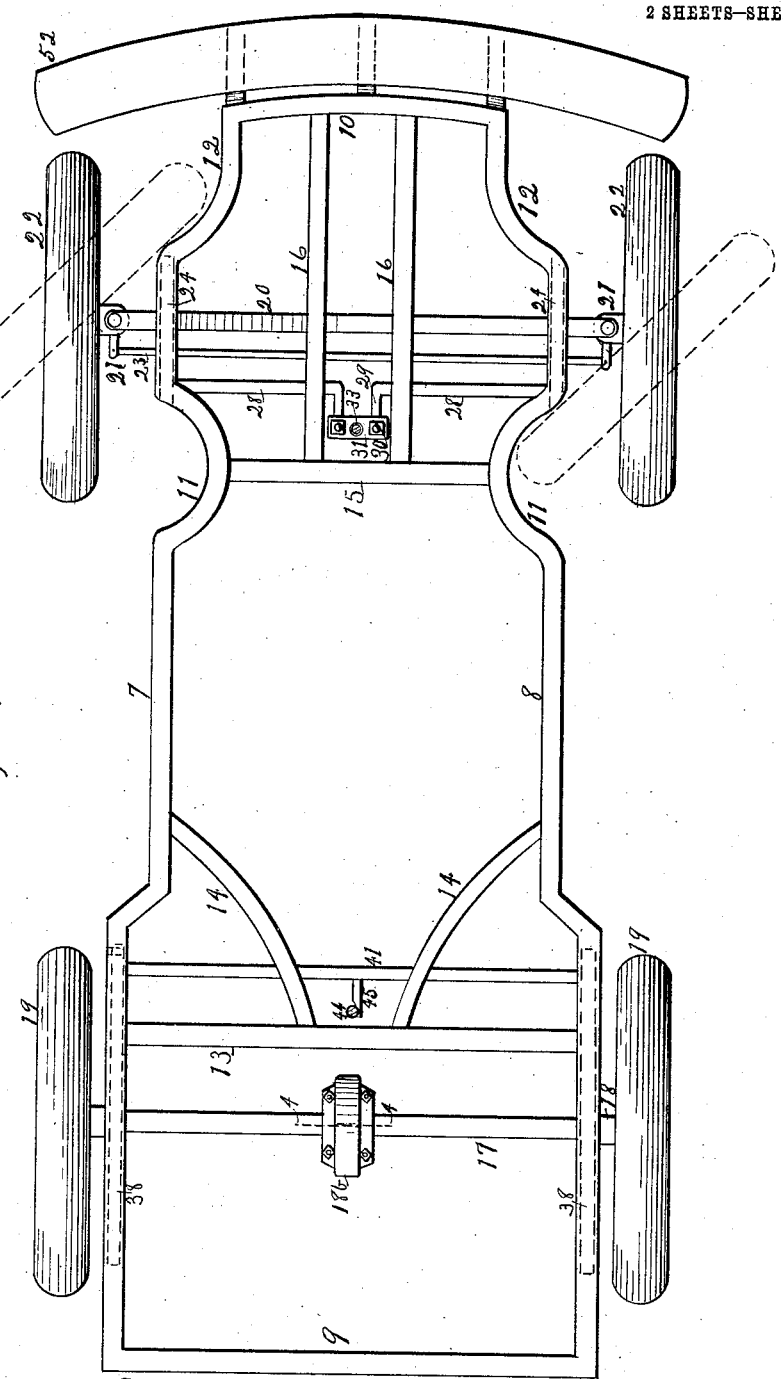

UNITED STATES PATENT OFFICE.

HOWARD G. CARR, OF HOOPESTON, ILLINOIS.

MOTOR-VEHICLE RUNNING-GEAR.

1,061,981.   Specification of Letters Patent.   Patented May 20, 1913.

Application filed July 8, 1911. Serial No. 637,513.

*To all whom it may concern:*

Be it known that I, HOWARD G. CARR, a citizen of the United States, residing at 910 East Main street, in Hoopeston, in the county of Vermilion and State of Illinois, have invented certain new and useful Improvements in Motor-Vehicle Running-Gears; and I do declare the following to be a full, clear, and exact description of the invention, such as will enable others skilled in the art to which it appertains to make and use the same.

My invention relates to improvements in the running-gear of vehicles, more particularly motor vehicles, and the objects of my invention are, first, to provide a running-gear of this character, which will be extremely light and inexpensive, and at the same time, strong, durable, and efficient; second, to provide a simple, strong, and durable resilient connection between the axles and the running-gear frame of a vehicle, and which prevent torsional stresess of the running-gear frame when one or the other of the wheels passes over an inequality in the road-way, and in which the running-gear frame will be supported at each of its four outer extremities, thereby providing means of eliminating torsional stresses from loads carried by the said running-gear frame.

The invention consists in the construction and combination of parts to be more fully described hereinafter and particularly set forth in the claims.

Reference is to be had to the accompanying drawings forming part of this specification, in which similar characters refer to corresponding parts throughout all of the views, and in which—

Figure 1 is a longitudinal section of an embodiment of my invention. Fig. 2 is a perspective view showing part of the forward end of the running-gear frame and its suspending device. Fig. 3 is a transverse section showing the details of the frame suspension of the rear end of the frame and the resilient device mounted between the frame and the frame suspending devices. Fig. 4 is a plan view of the running-gear.

Referring now to the drawings, by reference characters, 7 is the frame of the running-gear, which comprises side or longitudinal members 8, a rear member 9, a front member 10, joining the rear and forward extremities, respectively, of the side members. The members 8 are connected by a cross bar 13 adjacent the shaft 41. The cross bar 13 is connected by means of inwardly disposed, curved braces 14 with the side members 8. The latter have between the inwardly curved parts 11 a cross bar 15 connected by longitudinal braces 16 with the front or end member 10 of the frame.

I employ a front axle 20 of the usual form, and preferably of I-beam section. The axle spindles 21 carrying the front or steering wheels 22 of any preferred or common form, are pivotally mounted at the ends of the axle in the customary manner, and are controlled by any suitable steering mechanism. Carriers 24 of the curved form shown in Fig. 1, and corresponding to the carriers 38, have their forward ends pivotally secured by means of pivot brackets 25 or the like, to the side members 8 of the frame. The carriers 24 extend under the front axle and are secured thereto, or are made integral therewith so that they serve to support it.

At the rear ends, each carrier is connected by means of double, pivoted links 26, with crank arms 27 of the shafts 28 pivotally carried by the frame. At the adjacent ends the shafts 28 have crank arms 29 at substantially right angles with the crank arms 27, and provided with bolts loosely mounted in openings of a connecting plate 31, by means of the nuts 32. The plate 31 has a bolt rod 33 extending loosely upward through an opening in the plate and through the floor 34 of the frame. The rod 33 has a crown plate 35 held in position by means of a nut upon the end of the rod. Between the plate 35 and the floor 34 is mounted a resilient device, which may be a spring as shown, rubber or pneumatic devices as preferred.

The rear or driving axle 18 has driving wheels 19 of the usual form, and is mounted underneath the frame, near its rear end. Carriers 38, which are curved in form as is shown most clearly in Fig. 1, extend over the rear axle and are constructed integral therewith. The forward ends of the carriers are connected by means of double links 39 with crank arms 40, rigid with a shaft 41. The latter is journaled in bearings 42 secured to the side members 8 of the running-gear frame. The floor 34 is mounted upon the frame 7 and carries the resilient devices 43, which may be a pair of spaced bow springs as shown, rubber, or pneumatic cushions as preferred, and substantially above the shaft 41. A rod 44 extends upwardly through an opening in the floor, and is pivotally connected with a rigid crank arm 45, near the center of the shaft 41. A plate 46 rests upon the springs and is secured to the rod by passing the rod through an opening in the plate and screwing a nut 47 upon the upper end of the rod. At their rear ends, the carriers 38 are pivotally secured by means of the bolts 48, or in any other suitable manner, to the side members 8 of the frame.

I provide, as set forth above, an improved vehicle running-gear, as distinguished from the running-gear usually used in vehicles of this character. The plate 31, owing to its loose connection with the bolts 30 and the bolt member 33, can rock or pivot; consequently, if one of the front wheels is raised, owing to an inequality in the surface of the roadway, the plate 31 is pivotally actuated through the shafts 28 and the crank arms, to depress the opposite wheel a corresponding distance; consequently leaving the resilient devices practically unaffected.

When a rear wheel passes over an inequality the opposite wheel is correspondingly raised or lowered, and any tendency to torsional stresses of the frame is thereby obviated, and the body moves upward or downward, swinging about an axis substantially parallel to the rear axle. In this way I provide a very flexible running-gear, which permits the wheels to adapt themselves to any inequalities in the surface upon which the vehicle may be traveling over, without subjecting the frame of the running-gear to any torsional stresses.

My invention is not limited to the specific embodiment thereof here illustrated, but may have various modifications within the scope of my invention.

I claim—

1. In a vehicle running-gear, axles having supporting wheels, a frame comprising side members, a rear end member, a front end member, transversely extending intermediate members secured at their respective ends to the said side members, longitudinally extending members secured at their respective ends to said intermediate members and other members of the said frame, means for suspending said frame from said axle permitting movements of said frame bodily only with respect to said axles whereby torsional stresses of said frame are avoided.

2. In a vehicle running-gear, axles having supporting wheels, a frame, carriers pivotally secured to said frame and connected to said axles, resilient devices secured to said frame, connecting means between said resilient devices and said axles, said means being arranged at opposite sides of said frame, and connecting means between each of said opposite carriers.

3. In a vehicle running-gear, axles having supporting wheels, a frame, carriers pivotally secured to said frame at both sides thereof and connected to said axle, means connecting said carriers whereby a movement of one of said carriers is transmitted to the other of said carriers, a resilient device secured between said connecting means and said frame, said resilient device being operatively associated with said connection.

4. In a vehicle running-gear, an axle having supporting wheels, a frame, carriers each secured at one end to said frame, and operatively connected intermediate its ends with said axle, a member movably mounted upon said frame, links connecting said carriers and said member, a rod controlled by said member, and a resilient device secured between said rod and said frame.

5. In a vehicle running-gear, an axle having supporting wheels, a frame, carriers pivotally secured at one of its ends to said frame and extending transversely of said axle, means of securing said axle and said carriers together, a shaft pivotally mounted upon said frame and having rigid arms, links connecting said arms and said carriers, a resilient device mounted upon said frame, a plate secured to said resilient device, a rod suspended from said plate, said shaft having a rigid arm pivotally secured to said rod.

6. In a vehicle running-gear, an axle having supporting wheels, a frame, carriers pivotally secured to said frame at opposite sides thereof and connected to said axles, and means connecting said carriers whereby a movement of one of said carriers effects an opposite movement of the other of the said carriers.

7. In a vehicle running-gear, an axle having supporting wheels, a frame, carriers movably connecting said axle and said frame, and a pivotal connection between said carriers whereby a downward movement of one of said carriers effects an upward movement of the other of said carriers.

8. In a vehicle running-gear, an axle having supporting wheels, a frame, carriers pivotally secured to said frame and connected with said axle, shafts mounted to rock with respect to said frame and having laterally extending arms, links connecting one of said arms of each of said shafts with one of said carriers, a resilient device mounted upon said frame, a plate secured upon said resilient device, a bolt suspended from said plate and connected with others of said arms of said shafts.

9. In a vehicle running-gear, an axle having supporting wheels, a frame, carriers pivotally secured to said frame and connected with said axle, a resilient device mounted upon said frame, a plate secured to said resilient device, a bolt rod pivotally held by said plate, a member pivotally held by said bolt rod, members pivotally connecting said members with one of said arms of each of said shafts whereby an upward movement of one of said carriers effects a downward movement of the other of said carriers.

In testimony whereof I have signed my name in the presence of two witnesses.

HOWARD G. CARR.

Witnesses:
 GEORGE W. DULEY,
 JOHN O. KLEIN.

Copies of this patent may be obtained for five cents each, by addressing the "Commissioner of Patents Washington, D. C."

DISCLAIMER.

1,061,981.—*Howard G. Carr*, Hoopeston, Illinois. MOTOR-VEHICLE RUNNING-GEAR. Patent dated May 20, 1913. Disclaimer filed March 30, 1916, by the patentee.

Enters this disclaimer—

"To that part of claim 1 in said specification which is in the following words to wit:

"comprising side members, a rear end member, a front end member, transversely extending intermediate members secured at their respective ends to the said side members, longitudinally extending members secured at their respective ends to said intermediate members and other members of the said frame."

[*Official Gazette, April 11, 1916.*]

Cl. 21—105.